United States Patent [19] | [11] Patent Number: 4,844,488
Flynn | [45] Date of Patent: Jul. 4, 1989

[54] CHUCK ACTUATOR SYSTEM AND METHOD

[76] Inventor: Jerome R. Flynn, 3857 Birch St., Suite 117, Newport Beach, Calif. 92660

[21] Appl. No.: 146,766

[22] Filed: Jan. 22, 1988

Related U.S. Application Data

[63] Continuation-in-part of Ser. No. 074,007, Jul. 16, 1987.

[51] Int. Cl.⁴ ............................................. B23B 31/06
[52] U.S. Cl. ..................................... 279/1 K; 81/3.4
[58] Field of Search .................... 279/1 K; 81/3.4, 16

[56] References Cited

U.S. PATENT DOCUMENTS

| | | |
|---|---|---|
| 1,913,906 | 6/1933 | Swenson . |
| 2,189,068 | 2/1940 | Hubbell ................................ 279/62 |
| 2,458,626 | 1/1949 | Norige ................................. 279/64 |
| 2,554,410 | 5/1951 | Horton ................................ 81/3.43 |
| 2,631,482 | 3/1953 | Rinehart ............................... 81/3.4 |
| 2,985,044 | 5/1961 | Gill ..................................... 81/3.4 |
| 4,095,811 | 6/1978 | Cohen ............................... 279/1 K |
| 4,323,324 | 4/1982 | Eberhardt .......................... 408/124 |
| 4,423,881 | 1/1984 | Whitehead ........................... 279/62 |
| 4,460,296 | 7/1984 | Sivertson, Jr. ..................... 408/124 |
| 4,575,108 | 3/1986 | Whitehead ........................... 279/59 |
| 4,655,464 | 4/1987 | Manschitz et al. .................. 279/64 |

FOREIGN PATENT DOCUMENTS

2385478 3/1977 France .
2041798A 9/1980 United Kingdom .

Primary Examiner—Gil Weidenfeld
Assistant Examiner—Daniel W. Howell
Attorney, Agent, or Firm—Lynn & Lynn

[57] ABSTRACT

A keyless chuck operating system comprises a hollow, generally cylindrical body formed of rubber or other similar substance preferably having a shore hardness in the range of 50 to 60. The body has a central cavity therein formed to fit firmly over a chuck locking drum. Tightening the jaws is accomplished by adjusting the drill for ordinary drilling with a right handed bit, firmly grasping the outer periphery of the chuck operating device, and then turning on the drill. Loosening the chuck jaws is done in a manner similar to tightening them except that the drill is adjusted to reverse the direction of rotation. The chuck actuation may include a plurality of gripping beads in the passage that receives the chuck body for gripping the chuck when the rotary tool is actuated. The outer periphery of the chuck operating device preferably has a plurality of indentations thereon to facilitate manual gripping of the device. The body may have a plurality of longitudinally aligned holes therein between its inner and outer edges. These holes permit the use of less material to make the device than if it were a solid body. The holes also assist in compressing the inner portion of the device around a chuck. The system includes a mounting adapter formed generally as a frustocone that fits inside the chuck operation device, which is then slid form the mounting adapter onto the chuck drum.

40 Claims, 6 Drawing Sheets

FIG. 10

CHUCK ACTUATOR SYSTEM AND METHOD

BACKGROUND OF THE INVENTION

This is a continuation-in-part of applicant's copending U.S. patent application Ser. No. 074,007, filed July 16, 1987.

This invention relates to apparatus and methods for operating chucks of rotary power tools and particularly to keyless operation of drill chucks and the like.

Rotary tools are commonly used to perform various operations such as drilling, screwing, sanding and the like. Rotary tools are used not only by professional amateur craftsman but also by orthopedic surgeons in operations such as installing artificial hip joints and bone screws. In orthopedic surgical procedures, it is often necessary to drill into a bone and tap threads into it so that the bone will retain a threaded screw or the like therein.

A typical rotary tool includes an electric or fluid motor unit mounted within a housing having a handle with a built in trigger switch for controlling the motor speed. A drive shaft projects forward from the motor and housing to carry a chuck assembly. The chuck assembly typically includes a chuck locking drum cylinder and a chuck inner cylinder. The inner cylinder is threadedly received on the drive shaft, and the locking drum cylinder is mounted concentric to the inner cylinder. The chuck jaws are threadedly engaged in the locking drum and are opened or closed in response to the locking drum being driven clockwise or counterclockwise relative to the shaft. Shafts of rotary tool implements such as drills, screwdrivers and the like include shank portions that are designed to be gripped by the chuck jaws. A typical chuck jaw structure is adjusted to receive differently sized tool shafts by turning the locking drum via a bevel gear positioned on a forward edge of the locking drum. The chuck jaws are manually opened or closed with the aid of a chuck key.

The use of a chuck key to open or close the chuck jaws has several disadvantages. The chuck key is easily misplaced or lost, which can cause problems particularly in surgical uses of rotary tools. Considerable time may be wasted in changing tools in the chuck jaws.

Several keyless chuck gripping devices are known in the art, but they have several disadvantages and have received little or no commercial acceptance. Previous keyless chuck gripping devices are difficult to install on an existing chuck, provide insufficient torque to tighten the chuck jaws sufficiently to retain a tool shaft therein, are difficult to manufacture and save little or no time over the use of a conventional chuck key.

SUMMARY OF THE INVENTION

A keyless chuck operating system according to the present invention comprises a hollow, generally cylindrical chuck operation device having a body formed of a thermoplastic material, rubber or other similar substance. The body is preferably formed of an elastomer having a shore hardness in the range of 40 to 70. The system further includes a mounting adapted that may be used to mount the chuck operation device on a chuck.

The present invention is designed for optimum operation with a reversible rotary power tool, such as an electric drill. The body of the chuck operation device has a central cavity therein formed to fit firmly over the chuck locking drum so that tightening the jaw requires only the steps of adjusting the drill for ordinary drilling with a right handed bit, firmly grasping the outer periphery of the body, and then turning on the drill. Loosening the chuck jaws is accomplished in a manner similar to tightening them except that the drill is adjusted to reverse the direction of rotation so that it turns in a direction that would facilitate removal of a conventional drillbit from a hole or loosen a conventional right hand threaded screw.

The chuck actuation device included in the present invention may include a plurality of beads in the passage that receives the chuck body. These beads aid in providing adequate force for gripping the chuck when the rotary tool is actuated. The beads preferably are aligned parallel with the longitudinal axis of the passage. Each bead also may start at an outer edge and extend only halfway through the thickness of the cylindrical body. The beads on each side of the body are preferably spaced at equal angles around the inside of the passage. The beads on the opposite sides of the centerline of the thickness of the body preferably are angularly offset from each other.

The outer periphery of the chuck operating device may include a plurality of indentations thereon to facilitate manual gripping of the device. The body may have a plurality of longitudinally aligned holes therein between its inner and outer edges. The holes assist the user in compressing the inner portion of the device around a chuck and also permit the use of less material to make the device than if it were a solid body.

DESCRIPTION OF THE PREFERED EMBODIMENT

Figure 1:
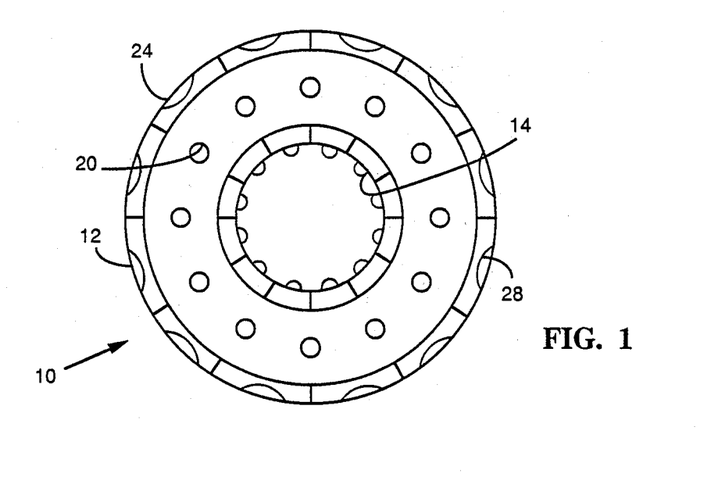
FIG. 1 is a plan view of a chuck actuating device that may be included in the present invention.
Figure 2:
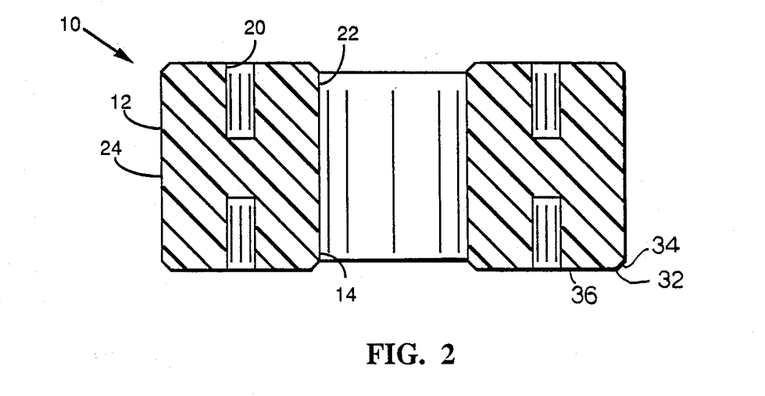
FIG. 2 is a cross sectional view of the device of FIG. 1 showing longitudinal holes extending part of the length of the body device.

Referring to FIGS. 1 and 2, a keyless chuck operating device 10 that may be included in the present invention is formed as a hollow, generally cylindrical body 12. The body 12 includes a central passage 14 therein for receiving a chuck locking drum (not shown) of a type well known in the art used for electric drills and the like. The walls of the central passage 14 may be textured to provide additional friction between the chuck drum and the chuck operating device 10. The chuck operating device 10 may be formed by a molding process described in greater detail subsequently. The textured surface 14 may be formed by sandblasting the part of the mold (not shown) used for forming the surface 14.

Figure 6:
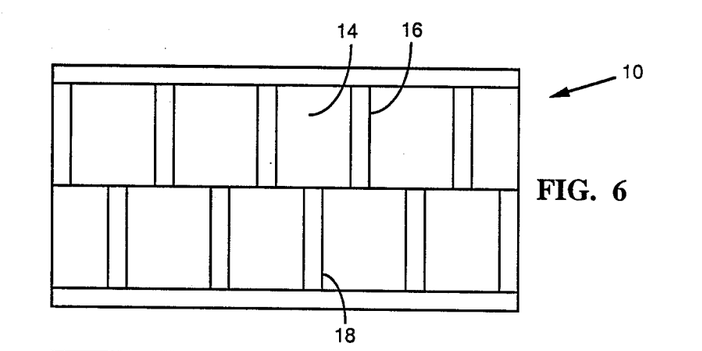
FIG. 6 illustrates the inner wall of the device of FIG. 1 showing gripping beads thereon.

Referring to FIGS. 1 and 6, a first plurality of bead 16 is formed on one half of the inner wall of the passage 14, and a second plurality of beads 18 is formed on the other half of the inner wall of the passage 14. The beads 16 are aligned with the longitudinal axis of the passage 14 and are preferably spaced apart by about 30°. The beads 16 are preferably semicylindrical with a diameter of about ⅛ inch. The beads 18 are formed essentially identically with the beads 16 except that the beads 18 are angularly offset from the beads 16 by about 15°, as best shown in FIG. 6. The placement and dimensions of the beads 16 and 18 are exemplary of a preferred embodiment of the invention and are not intended to limit the scope of the invention.

Figure 5:
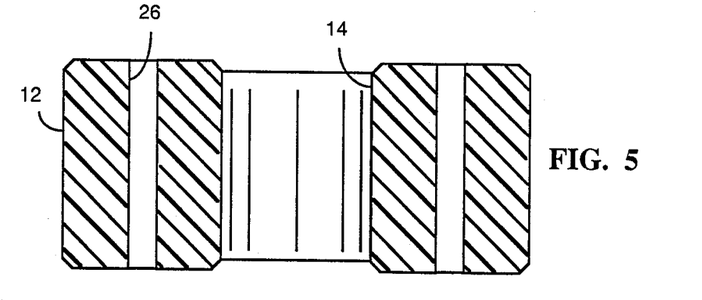
FIG. 5 is a cross sectional view of the device of FIG. 1 showing longitudinal holes extending the entire length of the device.

Referring to FIGS. 1 and 2, the body 12 may include a plurality of axially aligned holes 20 therein. These holes are preferably about 30° apart, but may be spaced apart by any other convenient angle. The holes 20 preferably are located midway between the inner wall 22 of the cylindrical body and its outer wall 24. As shown in FIG. 2, the holes 20 may extend only part of the thickness of the body 12. However, referring to FIG. 5, the body may include holes 26 that extend the entire thickness of the body 12. The holes permit the use of less material to manufacture the device 10 than if it were a solid piece of material. The holes also assist the user in compressing the device against the chuck of a rotary tool.

Figure 7:
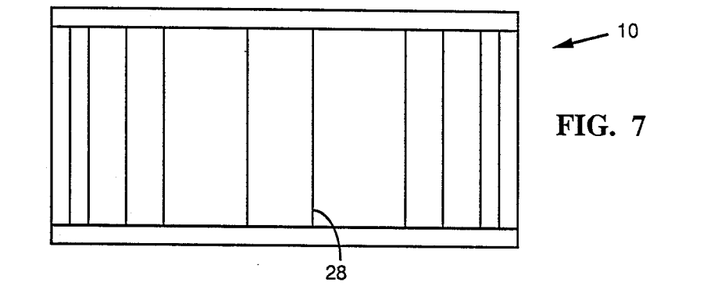
FIG. 7 illustrates the outer wall of the device of FIG. 1 showing indentations thereon that facilitate an operator's grasping the device.

Referring to FIGS. 1 and 7, the outer surface 24 of the device 12 may have a plurality of angularly spaced indentations 28 therein. These indentations 28 assist the user in gripping the device when it is mounted to a drill chuck. The indentations 28 may be spaced apart by any desired angle. In the illustrated preferred embodiment the indentations 28 are located between the holes 22 or 24.

Figure 8:
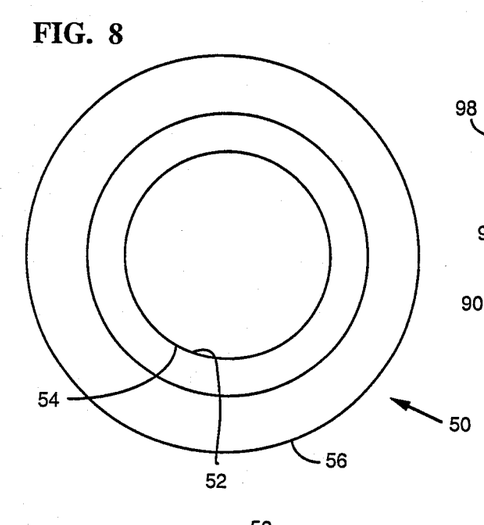
FIG. 8 is a plan view of another embodiment of the chuck operation device that may be included in the present invention.
Figures 9, 10:
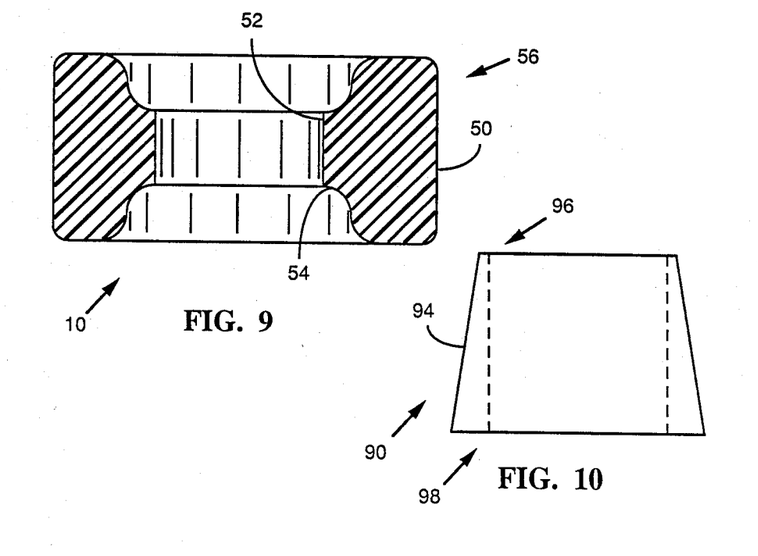
FIG. 9 is a a cross sectional view of the device of FIG. 8.
FIG. 10 is a side elevation view of a cone-shaped mounting adapter that may be used to mount the chuck operation devices of FIGS. 1–9 on a rotary tool chuck.

Referring to FIGS. 8 and 9, the chuck actuator device 10 may be formed as a generally hollow cylindrical body 50 having a central passage 52. The central passage 52 may be formed in a reduced thickness portion 54 of the body 50. The inner wall surface may be textured to enhance its ability to grip the chuck. The outer surface 56 of the body 50 may also be textured to provide increased friction between it and the hand of a user.

Figure 3:
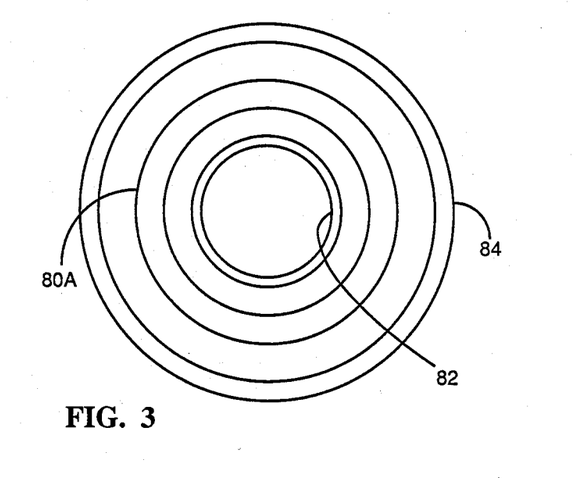
FIG. 3 is a plan view of a chuck operation device that may be included in the present invention showing an annular groove in the body.
Figure 4:
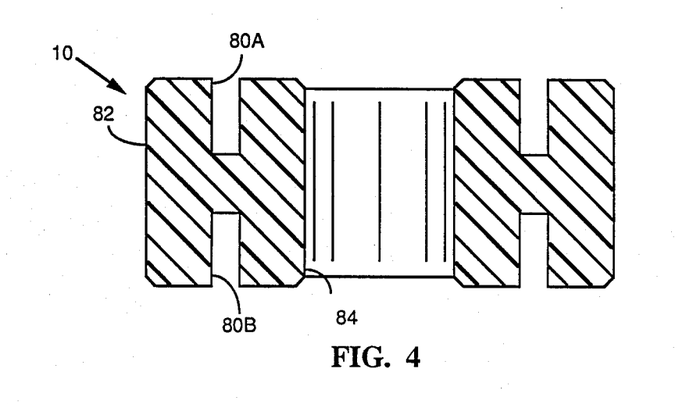
FIG. 4 is a cross sectional view of the chuck operation device of FIG. 3.

Referring to FIGS. 3 and 4, the body may include a pair of annular recesses 80A and 80B located on opposite sides thereof between its inner and outer curved surfaces 82 and 84, respectively. The annular grooves serve the same function as the holes 20 of FIG. 1.

Referring again to FIG. 1, the chuck operation device 10 is used to operate the jaws of a chuck by first placing the body 12 on the chuck so that the inner walls 14 firmly grip the outer surface of the chuck locking drum. It is recognized that chuck locking drums of various diameters may exist. The diameter of the passage 14 should be selected such that the body 12 will fit upon the chuck drum. Since the body 12 is formed of an elastomer, the diameter of the passage 14 may be slightly less than the diameter of the chuck. The elastomer permits the body 12 to stretch to fit over the chuck drum. Since the invention is designed to remain upon the chuck when the rotary tool is being operated, the inner diameter of the passage 14 must not be large enough to permit the body 12 to fall off the chuck.

After the chuck operation device 10 is mounted on the chuck, the chuck jaws may be operated if the user grasps the outer periphery of the chuck actuation device with one hand and turns on the motor of the rotary tool with the other hand. Torque developed by the force on the chuck from pressing the inner walls of the chuck operation device 10 against the chuck will tighten or loosen the jaws depending upon the direction the chuck tends to rotate after the motor is turned on.

The chuck operating device 10 is preferably formed of an elastomeric material having a shore hardness in the range of 40 to 70. This hardness permits the chuck operation device 10 to be mounted on a chuck and provides the firmness required to operate the chuck.

The chuck operation device 10 is preferably formed by molding using generally well known molding techniques. Conventional molding practice would entail placement of a mold parting line in the center of the outer periphery of the body 12. However, a parting line in the center of the body might interfere with an operator's grasping the chuck operating device 10. In particular in uses of the invention in orthopedic surgery, the center parting line could tear the surgical glove of the user. Referring of FIG. 2, in order to provide a smooth outer surface, the mold (not shown) for the device is formed to have its parting line and gate on a corner 32 defined by the beveled edge 34 between the curved sidewall and the flat surface 36. The parting line and gate may also be on the inner surface 22.

Figure 11:
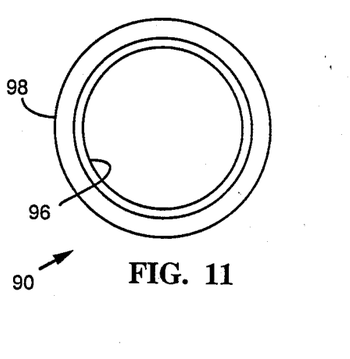
FIG. 11 is and end view of the smaller end of the mounting adapter of FIG. 10.
Figures 12, 15:
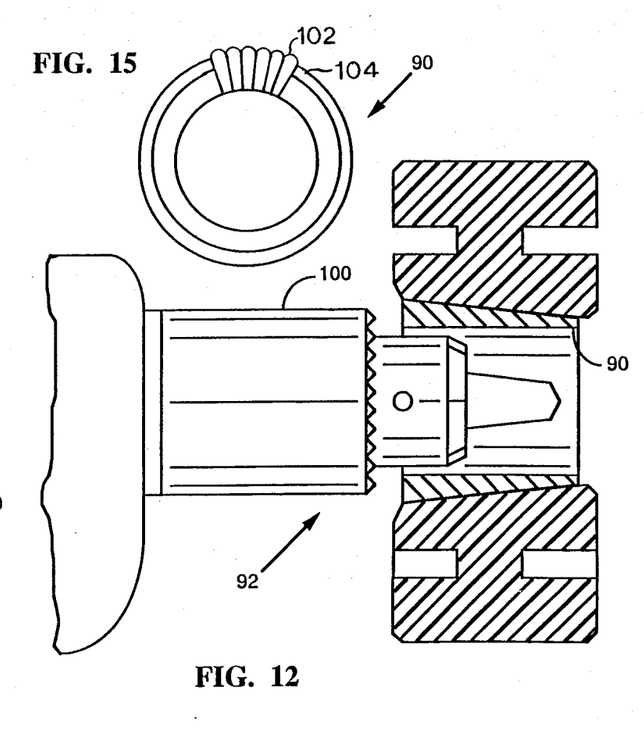
FIG. 12 illustrates the mounting adapter of FIGS. 10 and 11 used to mount a chuck operation device on a rotary tool chuck.
FIG. 15 is an elevation view of the smaller end of the mounting adapter of FIG. 13.

Referring to FIGS. 10-16, a mounting adapter 90 may be used to mount the chuck operation device 10 on a chuck 92 as shown in FIG. 12. The mounting adapter 90 is preferably formed generally as a hollow frustocone cone. Referring to FIGS. 10 and 11, the mounting adapter 90 preferably has a cylindrical passage 93 therein having a sidewall 94 that is thinner at the narrower end 96 of the truncated cone than at the wider end 98. Referring to FIG. 12, the narrower end 96 of the mounting adapter 90 easily fits inside the central passage 22 of the chuck operation device 10. The mounting adapter 90 is then pressed into the central passage 14.

Figure 16:
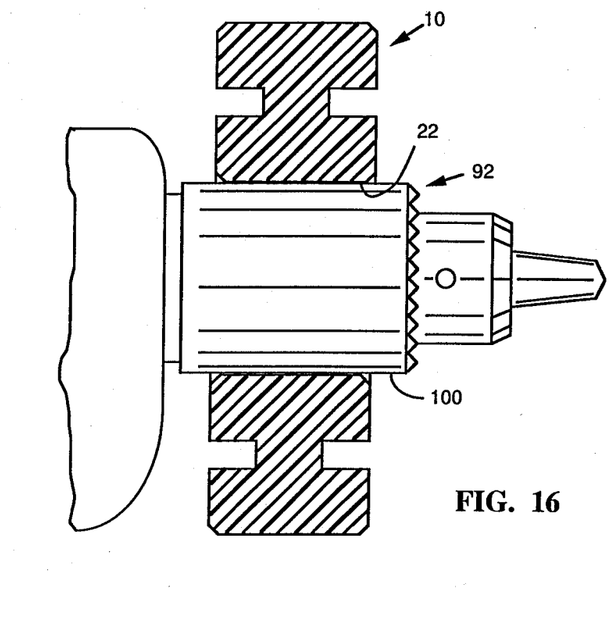
FIG. 16 shows a chuck operation device according to the invention mounted on a rotary tool chuck.

The larger end of the mounting adapter 90 with chuck operation device 10 mounted thereon is then placed adjacent the drum 100 of the chuck 92. The chuck operation device 10 is then pushed toward the chuck drum 100. The diameter of the cylindrical passage 93 in the mounting adapter 90 is smaller than that of the chuck drum 100. Therefore pushing the chuck operation device 10 toward the chuck drum 100 as shown in FIG. 12 causes the edge of the larger end of the mounting adapter 90 to engage against the outer end of the chuck drum 100. Referring to FIG. 16, if sufficient force is used to urge the chuck operation device 10 toward the chuck drum 100, the chuck operation device 10 sides off the mounting adapter 90 onto the chuck drum 100. The unstretched diameter of the central passage 22 is smaller than the diameter of the chuck drum 100. Therefore, use of the mounting adapter 90 facilitates stretching the chuck operation device 10 by an amount sufficient to place it on the chuck drum. The elasticity of the chuck operation device 10 then causes it to firmly grip the chuck drum 100 to restrict the chuck operation device 10 from rotating on the chuck drum 100.

Figure 13:
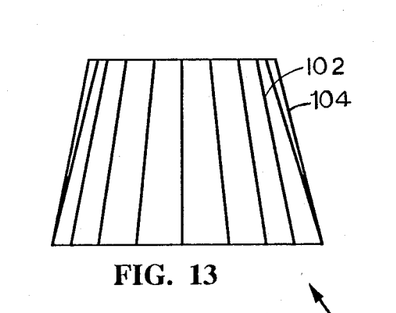
FIG. 13 illustrates a cone-shaped mounting adapter having a ribbed side.
Figure 14:
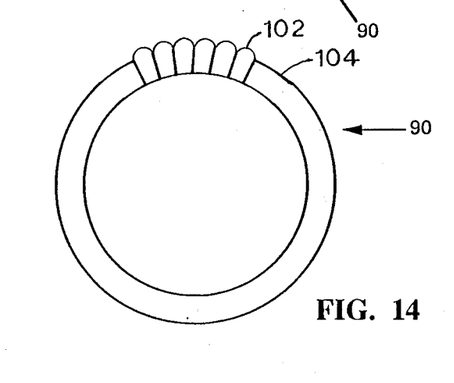
FIG. 14 is an elevation view of the larger end of the mounting adapter of FIG. 13.

Referring to FIGS. 13–15, the mounting adapter 90 may include a plurality of ribs or ridges 102 on its outer surface 104. The ridges 102 may also be on the ends 96 and 98. The ridges 102 serve to reduce friction between the outer surfaces of the mounting adapter 90 and the inner surface 22 of the chuck operation device 10. FIGS. 14 and 15 show the ridges 102 to extend only a part of the distance around the curved outer surface 104 of the mounting adapter 90 only for convenience of illustration. Actually the ridges 102 preferably extend completely around the mounting adapter 90 as shown in FIG. 13.

The mounting adapter 90 preferably is molded from an elastomeric material that has a low coefficient of friction with the material of the chuck operation device 10. The mounting adapter 90 also should have sufficient strength and rigidity to allow it to be inserted into the central passage 22 and to permit the chuck operation device 10 to be slid from it onto the chuck drum 100.

What is claimed is:

1. A system for operating a chuck of a rotary tool, the chuck including a plurality of jaws that may be tightened around a tool shank or disengaged from the shank by rotation of a chuck drum relative to the tool shank, comprising:
   a generally cylindrical body having a pair of end surfaces and a curved outer surface, the body having a central passage extending between the end surfaces;
   a radially inward facing wall formed in the central passage configured for mounting the body on the chuck drum;
   a generally radially outward facing gripping surface formed on the body and configured for being grasped by a human hand;
   the body including at least one recess formed in one of the end surfaces, the body being formed of an elastomer such that a user may manually compress the body around the chuck drum to exert a force thereon such that application of power to the rotary tool while the user compresses the body on the chuck drum causes the chuck drum to rotate, thereby tightening or loosening the chuck jaws, depending upon the direction of rotation of the chuck drum; and
   a mounting adapter having a first end configured for insertion into the central passage and a second end for engagement against an edge of the chuck drum so that the body may be slid over the adapter onto the chuck drum.

2. The system of claim 1, including a plurality of recesses formed in each of the end surfaces of the body.

3. The system of claim 2 wherein the recesses are generally cylindrical and have longitudinal axes aligned generally parallel with the central passage.

4. The system of claim 3, further comprising means formed in the central passage for gripping the chuck drum.

5. The system of claim 4, wherein the means for gripping the chuck drum includes a plurality of gripping beads formed inside the central passage.

6. The system of claim 5 wherein the gripping beads are arranged such that a first group of gripping beads extends longitudinally from a first flat outer edge of the cylindrical body to a region near the longitudinal centerline of the central passage, the first group of gripping beads being spaced apart by generally equal angles and such that a second group of gripping beads extends longitudinally from a second flat outer edge of the cylindrical body to the region near the longitudinal centerline of the central passage, the second group of gripping beads being spaced apart by equal angles generally equal to the angles for the first group of gripping beads, the second group of gripping beads being angularly offset from the first group of gripping beads to approximately bisect the angles between each of the first group of gripping beads.

7. The system of claim 4, wherein the means for gripping the chuck drum includes a textured surface formed inside the central passage.

8. The system of claim 1, further comprising means formed in the central passage for gripping the chuck drum.

9. The system of claim 8, wherein the means for gripping the chuck drum includes a plurality of gripping beads formed inside the central passage.

10. The system of claim 9 wherein the gripping beads are arranged such that a first group of gripping beads extends longitudinally from a first flat outer edge of the cylindrical body to a region near the longitudinal centerline of the central passage, the first group of gripping beads being spaced apart by generally equal angles and such that a second group of gripping beads extends longitudinally from a second flat outer edge of the cylindrical body to the region near the longitudinal centerline of the central passage, the second group of gripping beads being spaced apart by equal angles generally equal to the angles for the first group of gripping beads, the second group of gripping beads being angularly offset from the first group of gripping beads to approximately bisect the angles between each of the first group of gripping beads.

11. The system of claim 8, wherein the means for gripping the chuck drum includes a textured surface formed inside the central passage.

12. The system of claim 1, further comprising means formed in the curved outer surface of the body for increasing friction between the body and the hand of a user of the device.

13. The system of claim 12 wherein the means formed in the curved outer surface of the generally cylindrical body for increasing friction between the body and the hand of a user of the device comprises a plurality of longitudinal indentations in the surface.

14. The system of claim 1 wherein the mounting adapter is formed generally as a frustocone having a cylindrically longitudinal passage therein.

15. The system of claim 14 wherein the mounting adapter includes means formed thereon for facilitating the sliding of the body from the mounting adapter onto the chuck drum.

16. The system of claim 15 wherein the means for facilitating the sliding of the body from the mounting adapter onto the chuck drum includes a plurality of ridges formed on the outer surfaces of the frustocone and extending between the ends thereof.

17. The system of claim 2 wherein the recesses extend into the body a distance less than half the thickness thereof.

18. The system of claim 2 wherein the recesses extend completely through the body.

19. The system of claim 1 wherein the body includes an annular groove in each end surface thereof.

20. The system of claim 1 wherein the body comprises a generally cylindrical outer portion having a first thickness, a generally cylindrical inner portion having a second thickness less than the first thickness, the inner portion having a central passage formed therein for mounting the body on a cylindrical chuck drum, and a tapered portion connected between the inner and outer portions, the tapered portion having a thickness equal to that of the inner and outer portions at the respective connections thereto.

21. A method for operating the chuck of a rotary tool, the chuck including a plurality of jaws that may be tightened around a tool shank or disengaged from the shank by rotation of a chuck drum relative to the tool shank, comprising the steps of:
   forming a generally cylindrical body having a pair of end surfaces and a curved outer surface;
   forming a central passage in the body between the end surfaces and configured for mounting on the chuck drum;
   forming a generally radially outward facing gripping surface on the body configured for being grasped by a human hand;
   forming at least one recess in one of the end surfaces;
   forming the body of an elastomer such that a user may manually compress the body around the chuck drum to exert a force thereon such that application of power to the rotary tool while the user compresses the body on the chuck drum causes the chuck drum to rotate, thereby tightening or loosening the chuck jaws, depending upon the direction of rotation of the chuck drum; and
   mounting the body on the chuck drum with an adapter having a first end configured for insertion into the central passage and a second end for engagement against an edge of the chuck drum so that the body may be slid over the adapter onto the chuck drum.

22. The method of claim 21, including the step of forming a plurality of recesses in each of the end surfaces of the body.

23. The method of claim 22 including the steps of forming the recesses to be generally cylindrical and to have longitudinal axes aligned generally parallel with the central passage.

24. The method of claim 23, further including the step of forming means in the central passage for gripping of the chuck drum.

25. The method of claim 24, including the step of forming the means for gripping the chuck drum to include a plurality of gripping beads formed inside the central passage.

26. The method of claim 25 including the steps of:
   arranging the gripping beads such that a first group of the gripping beads extends from a first flat outer edge of the cylindrical body to a region near the center of the central passage;
   spacing the first group of gripping beads apart by generally equal angles;
   extending a second group of gripping beads from a second flat outer edge of the cylindrical body to the region near the center of the central passage;
   spacing the second group of gripping beads apart by angles generally equal to the angles for the first group of gripping beads; and
   offsetting the second group of gripping beads angularly from the first group of gripping beads to approximately bisect the angles between each of the first group of gripping beads.

27. The method of claim 24 including the step of forming the means for gripping the chuck drum to include a textured surface formed inside the central passage.

28. The method of claim 21, further including the step of forming means in the central passage for gripping the chuck drum.

29. The method of claim 28, including the step of forming the means for gripping the chuck drum to include a plurality of gripping beads formed inside the central passage.

30. The method of claim 29 including the steps of:
   arranging the gripping beads such that a first group of the gripping beads extends from a first flat outer edge of the cylindrical body to a region near the center of the central passage;
   spacing the first group of gripping beads apart by generally equal angles;
   extending a second group of gripping beads from a second flat outer edge of the cylindrical body to the region near the center of the central passage;
   spacing the second group of gripping beads apart by angles generally equal to the angles for the first group of gripping beads; and
   offsetting the second group of gripping beads angularly from the first group of gripping beads to approximately bisect the angles between each of the first group of gripping beads.

31. The method of claim 28 including the step of forming the means for gripping the chuck drum to include a textured surface formed inside the central passage.

32. The method of claim 21, further including the step of forming means in the curved outer surface of the body for increasing friction between the body and the hand of a user of the device.

33. The method of claim 32 including the step of forming the means formed in the curved outer surface of the generally cylindrical body for increasing friction between the body and the hand of a user of the device to comprise a plurality of longitudinal indentations in the surface.

34. The method of claim 21 including the step of forming the mounting adapter generally as a frustocone having a cylindrical longitudinal passage therein.

35. The method of claim 34 including the step of forming the mounting adapter to include means for facilitating the sliding of the body from the mounting adapter onto the chuck drum.

36. The method of claim 34 including the step of forming the means for facilitating the sliding of the body from the mounting adapter onto the chuck drum to include a plurality of ridges formed on the outer surfaces of the frustocone and extending between the ends thereof.

37. The method of claim 22 including the step of forming the recesses to extend into the body a distance less than half the thickness thereof.

38. The method of claim 22 including the step of forming the recesses to extend completely through the body.

39. The method of claim 21 including the step of forming the body to include an annular groove in each end surface thereof.

40. The method of claim 21 including the steps of forming the body to comprise a generally cylindrical outer portion having a first thickness;

forming a generally cylindrical inner portion having a second thickness less than the first thickness, the inner portion having a central passage formed therein for mounting the body on a cylindrical chuck drum; and forming a tapered portion connected between the inner and outer portions, the tapered portion having a thickness equal to that of the inner and outer portions at the respective connections thereto.

* * * * *